July 24, 1962 R. P. HERLONG 3,045,467
MANIPULATION RESISTIVE COMBINATION LOCK
Filed Jan. 7, 1960 5 Sheets-Sheet 1

INVENTOR.
Robert P. Herlong
BY
Frease, Bishop, Johns & Schick
ATTORNEYS

July 24, 1962          R. P. HERLONG          3,045,467

MANIPULATION RESISTIVE COMBINATION LOCK

Filed Jan. 7, 1960          5 Sheets-Sheet 2

INVENTOR.
Robert P. Herlong
BY
Frease, Bishop, Johns & Schick
ATTORNEYS

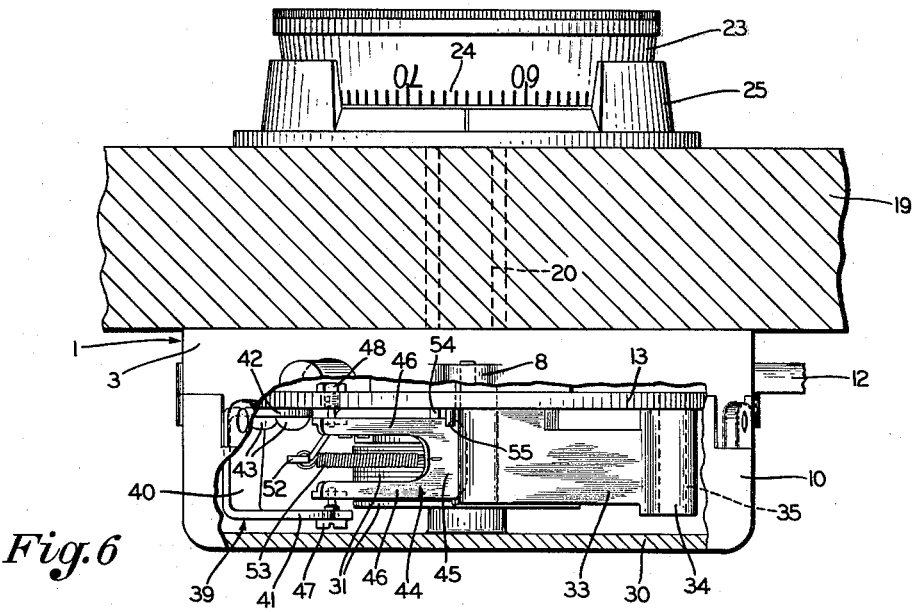
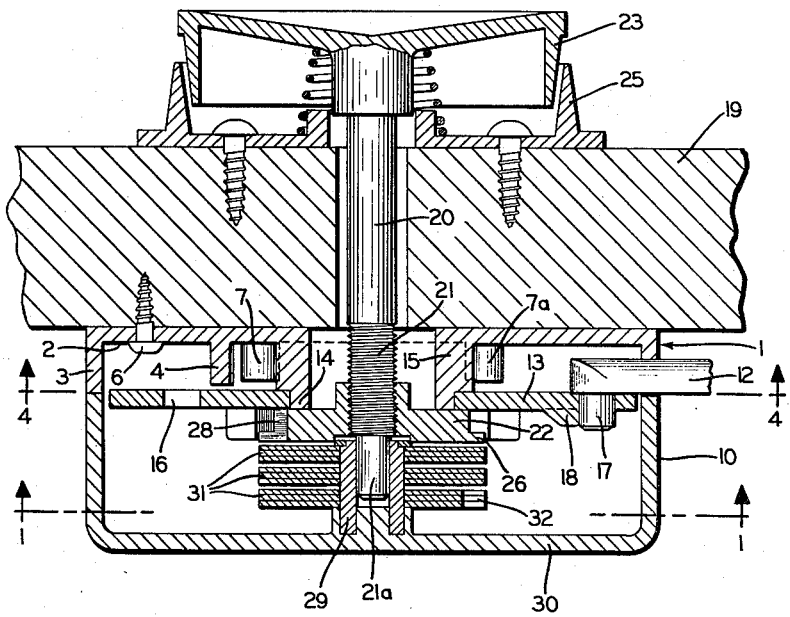

July 24, 1962    R. P. HERLONG    3,045,467
MANIPULATION RESISTIVE COMBINATION LOCK
Filed Jan. 7, 1960    5 Sheets-Sheet 4

INVENTOR.
Robert P. Herlong
BY
Frease, Bishop, Johns & Schick
ATTORNEYS

July 24, 1962  R. P. HERLONG  3,045,467
MANIPULATION RESISTIVE COMBINATION LOCK
Filed Jan. 7, 1960  5 Sheets-Sheet 5

INVENTOR.
Robert P. Herlong
BY
Frease, Bishop, Johns & Schick
ATTORNEYS

United States Patent Office 3,045,467
Patented July 24, 1962

3,045,467
MANIPULATION RESISTIVE COMBINATION LOCK
Robert P. Herlong, Canton, Ohio, assignor to Diebold, Incorporated, Canton, Ohio, a corporation of Ohio
Filed Jan. 7, 1960, Ser. No. 1,027
12 Claims. (Cl. 70—322)

The invention relates to combination locks of the general type disclosed in Abbott and Miller Patent No. 1,956,304, dated April 24, 1934, and more particularly to means for preventing the detection, by manipulation, of the combination of the lock.

Combination locks of the general type disclosed in said patent comprise a housing with a plurality of coaxial cylindrical tumblers of equal diameters rotatably mounted within the housing. A spindle extends into the housing and has a knob on its outer end, rotatable within a dial ring, and a cylindrical driver cam, with an operating notch or gate in its periphery, is fixed upon the spindle beyond the tumblers.

Usual pin, lever and circular segment means coact between the driver cam and the innermost tumbler, and between each tumbler and the next outer tumbler, as disclosed in detail in said Abbott and Miller patent, whereby by manipulation of the dial and setting the combination, the gates or notches of the tumblers are aligned with each other and with the operating notch of the driver cam for unlocking the lock.

Such locks further include bolt means and an operating lever pivotally connected thereto at one end, the lever having a driver lug or tongue depending from its outer end and a fence extending from the inner side thereof parallel with the axis of the tumblers.

When the tumbler gates are aligned with each other and with the fence, and the operating notch of the driver cam is located in aligned position below the driver lug or tongue, the fence is permitted to drop into the tumbler gates or notches and the cam follower tongue is permitted to drop into the operating notch of the driver cam, whereby the bolt means may be withdrawn from its extended locking position, and whereby the bolt means may also be extended to locking position, by suitable rotation of the spindle.

After the bolt means is extended into locking position, the spindle may then be spun in reverse direction to scramble the combination by turning the tumblers so that the gates are out of alignment with each other.

Combination locks of the above character are widely used today and have become standardized to a point where all common types of such locks operated on substantially the same broad principle. Through such standardization these locks are now relatively inexpensive to produce, and are kept on such low cost basis through elimination of high precision in the manufacture thereof.

Accordingly, as far as I am aware, there is no combination lock upon the market today that cannot be operated by those familiar with the broad principles thereof, even though the particular combination is not known to them.

Manifestly, such locks could be manufactured with high accuracy of all of the complicated parts thereof to render the operation thereof difficult when the combination is not known, but the expense of manufacture would be so great as to be commercially impractical in this highly competitive field.

Furthermore, even though a combination lock were made with care and precision, the same would soon become worn to a point where the expert could easily determine the combination and thereby operate the lock. As a matter of fact, it is common practice for pick-locks to rapidly rotate the spindle of a lock, by means of an electric drill or the like, in order to quickly wear down the parts so that the combination may be easily determined.

It is appreciated that there have heretofore been developed means intended to accomplish the same broad purpose of the present invention, but such prior devices have been impractical for many reasons, including the necessity of rebuilding the combination lock in its entirety; an excessive expense of manufacture; complicated formation and assembly of parts, continued operational difficulties and complicated operation of the combination lock itself.

It is, therefore, a primary object of the present invention to provide a combination lock which is positively pick-proof through the provision of over-center spring means pressing the fence away from the tumblers to prevent the feel and sound effects inherent in the usual lock which serve to aid in the unauthorized manipulation thereof.

It is known that an attempt has been made to provide an over-center spring mechanism for this purpose. However, in such devices, the over-center spring means is so arranged that it normally presses the fence toward the tumblers, and the fence is only held away from the tumblers during a part of each revolution by means of a lever and link mechanism having a stud riding in a cam groove.

By rapidly running this lock to wear down, when the stud is worn away, the spring will hold the fence continually in contact with the tumblers so that the lock may be manipulated.

Another important object of the present invention is the provision of over-center spring mechanism for holding the fence away from the tumblers excepting momentarily at one point during each revolution, whereby if the lock is run to wear down the parts, the spring will hold the fence out at all times and the lock cannot be operated.

A further object of the invention is the provision of such a device in which an over-center spring mechanism normally holds the fence away from the tumblers and simultaneously holds a trigger in position to be tripped by a cam nub, once in each revolution, to move the fence toward the tumblers, the over-center spring mechanism then instantly moving the fence away from the tumblers and resetting the trigger.

The above and other objects, apparent from the drawings and following description, may be attained, the above described difficulties overcome and the advantages and results obtained, by the apparatus, construction, arrangement and combinations, subcombinations and parts which comprise the present invention, a preferred embodiment of which, illustrative of the best mode in which applicant has contemplated applying the principle, being set forth in detail in the following description and illustrated in the accompanying drawings.

In general terms, the invention may be stated as comprising a combination lock comprising a series of rotatable tumblers having gates therein, an axially aligned driver cam having an operating notch therein, bolt means, an operating lever pivotally connected at one end to the bolt means and having at its free end a fence adapted to drop into the gates of the tumblers when they are aligned with each other and with the fence, and a lug or tongue adapted to drop into the operating notch of the driver cam, a lever actuator pivoted at one end upon the bolt means, the other end being pivotally connected to the free end of the operating lever, a trigger pivotally mounted upon the bolt means, a spring connecting the trigger to the free end of the lever actuator for normally holding the fence away from the tumblers, and a cam nub or high point upon the operating cam for engaging the trigger once during each revolution, to momentarily move the fence toward the tumblers, the spring immediately pulling the fence away from the tumblers and resetting

3 the trigger the instant the trigger is released by the cam nub.

Having thus briefly described the invention, reference is now made to the accompanying drawings showing a preferred embodiment of the invention, in which:

FIG. 5 is a transverse sectional view through the lock, taken on the line 5—5, FIG. 1;

FIG. 6 is a top plan view of the lock with a portion of the housing broken away for the purpose of illustration;

In the embodiment of the invention illustrated, the housing for the lock is indicated generally at 1 and comprises the back wall 2 and peripheral side wall 3. Although the form of the combination lock shown has a circular housing for accommodating a circular cam plate which operates a plurality of radially disposed bolts, it should be understood that this in itself forms no part of the invention, which is equally applicable to the single reciprocating bolt lock such as shown in the Abbott and Miller patent above referred to, in which the parts are enclosed within a rectangular housing.

Figure 4:
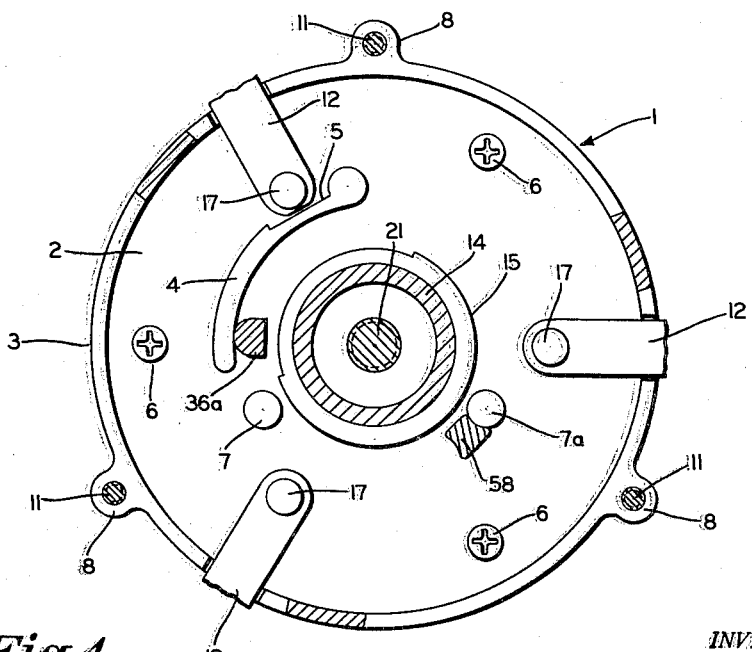
FIG. 4 is a plan section, taken on the line 4—4, FIG. 5, showing the extension of the fence riding under the arcuate rib on the back wall of the housing.
Figure 13:
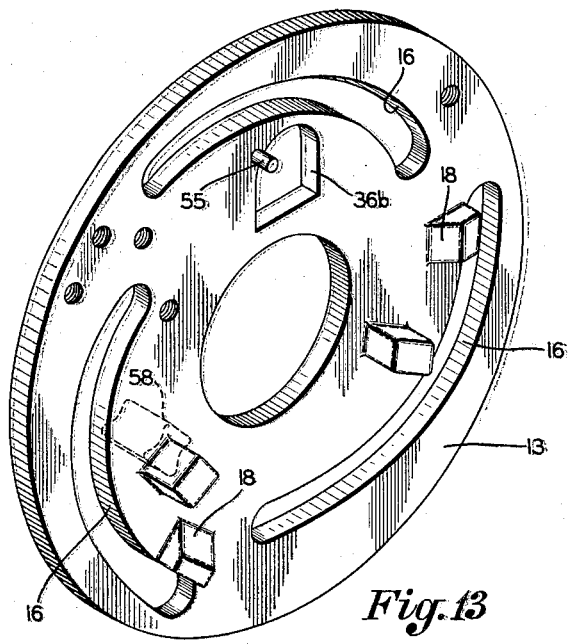
FIG. 13 is an enlarged, detached, perspective view of the cam plate which operates the bolts.
Figure 7:
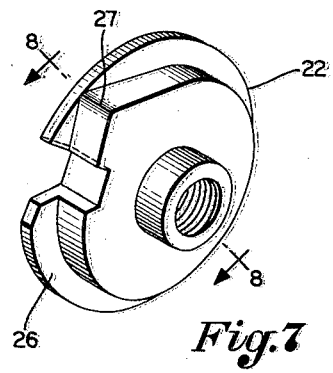
FIG. 7 is a detached perspective view of the driving cam.
Figure 12:
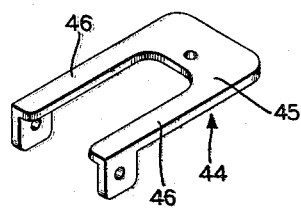
FIG. 12 is a detached, enlarged, perspective view of the lever actuator.
Figure 9:
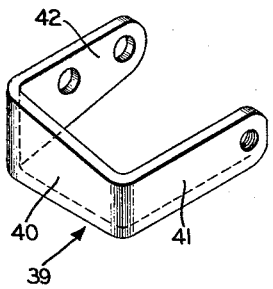
FIG. 9 is a detached, enlarged perspective view of the bracket upon which the lever actuator is pivoted.
Figure 11:
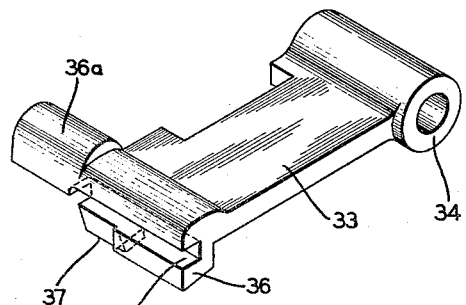
FIG. 11 is a detached, enlarged perspective view of the operating lever showing the fence formed integrally therewith.
Figure 10:
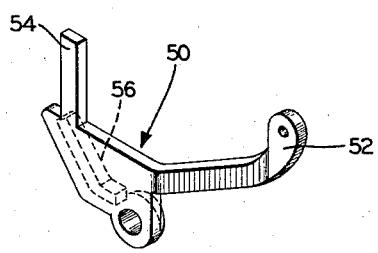
FIG. 10 is a detached, enlarged perspective view of the trigger.
Figure 8:
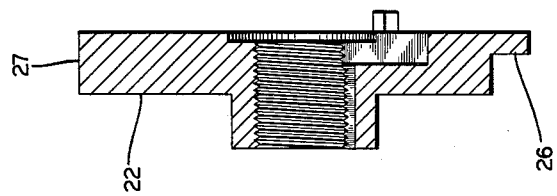
FIG. 8 is an enlarged, transverse sectional view of the driving cam, taken on the line 8—8, FIG. 7.
Figure 14:
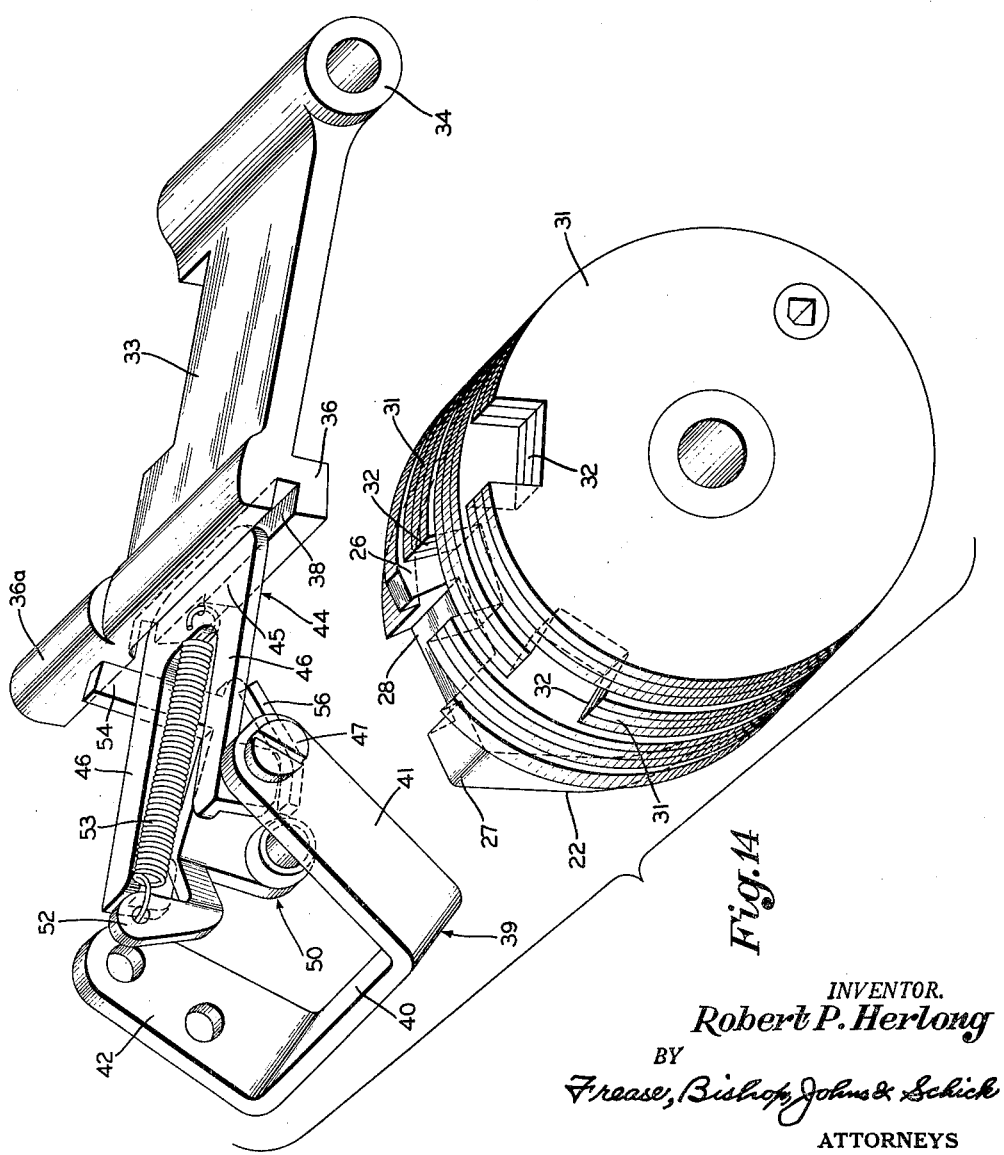
FIG. 14 is an enlarged, exploded, perspective view of the tumblers and driver cam and the over-center spring mechanism for actuating the fence.

An arcuate rib 4 is formed on the back wall 2, for a purpose to be later explained, and is shown having a recess 5 in its outer side to receive the inner end of the adjacent lock bolt when the same is moved to unlocked position, as shown in FIG. 4 and hereinafter described.

Attaching screws 6 are located through suitable openings therefor in the back wall of the housing for attaching the lock to a safe or vault door or the like. A spaced pair of studs or projections 7 and 7a are formed upon the back wall of the housing, the purpose of which will appear as the description of the lock unfolds.

Spaced ears 8 are formed upon the peripheral side wall 3 of the housing and adapted to register with similar ears 9 upon the cover 10, screws 11 being located through said ears 8 and 9 for securing the cover upon the housing.

For the purpose of operating a plurality of radially disposed locking bolts 12, a bolt-operating cam plate 13 is provided within the housing. This cam plate is rotatably mounted upon the shouldered end portion 14 of a bearing boss 15 concentrically formed within the housing.

A plurality of arcuate cam slots 16, equal in number to the bolts 12, are formed in the cam plate 13, and an angular stud 17 upon the inner end of each bolt 12 is slidably located in each of the cam slots 16.

Figure 1:
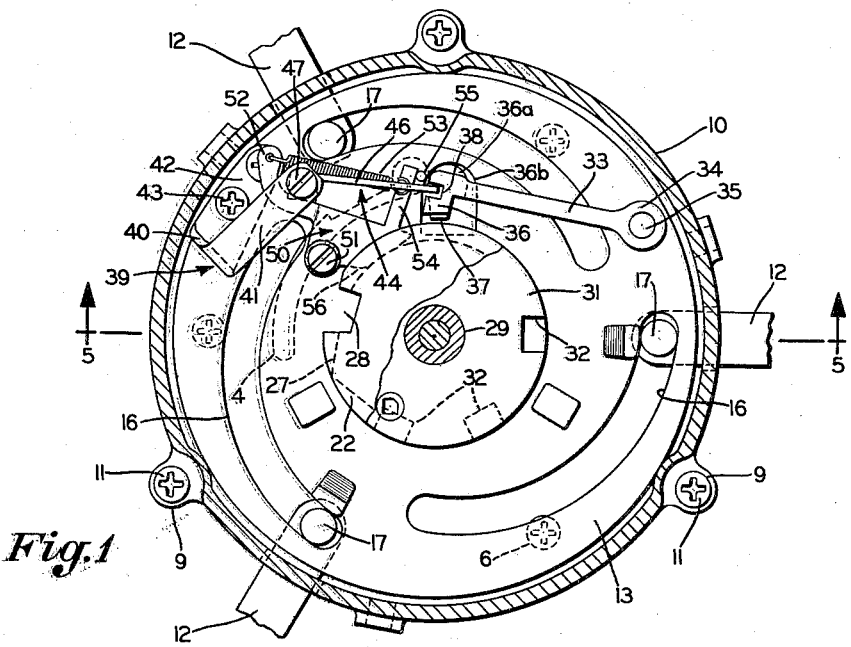
FIG. 1 is a plan sectional view of the lock taken on line 1—1, FIG. 5, showing the over-center spring mechanism in the normal position holding the fence away from the tumblers.
Figure 3:
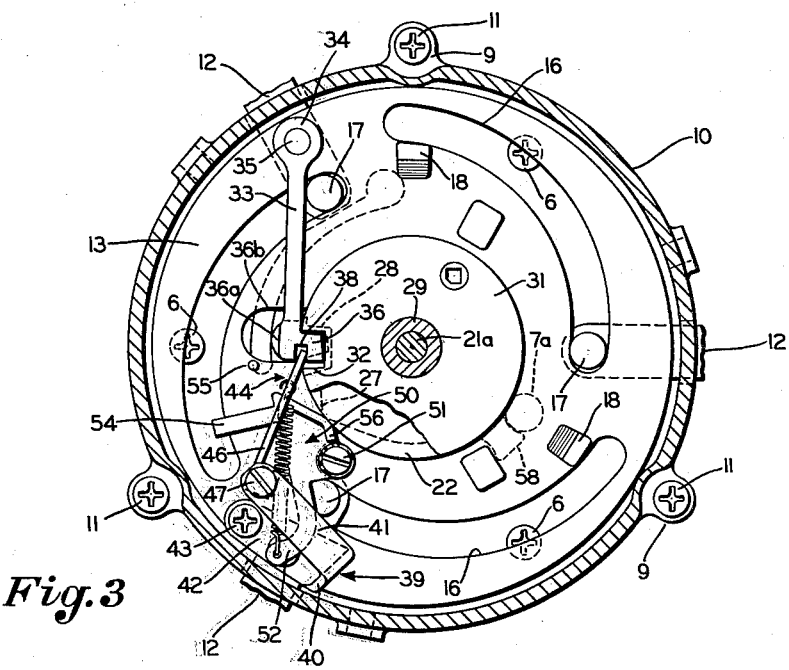
FIG. 3 is a view similar to FIG. 2, showing the fence received in the aligned gates of the tumblers and the tumblers rotated to retract the bolts.

Locking lugs 18 are formed upon the cam plates 13 at the inner ends of the slots 16 for contact with the studs 17 when the bolts are in locked position, as shown in FIGS. 1 and 3, for preventing the bolts from being retracted.

As shown in FIG. 5, the housing of the lock is attached to a door 19 of a safe, vault or the like. A spindle 20 is journalled through the door and has a threaded end 21 extending into the lock housing, upon which is mounted the driver cam 22.

The usual knob 23 with dial 24 thereon is fixed upon the outer end of the spindle 20, the knob and dial being rotatable within the usual dial ring 25 upon the outer surface of the door. Although the driver cam 21 is shown as threaded upon the spindle 20, it may be fixed upon the spindle by any other usual and well known means.

A peripheral flange 26 is formed upon the driver cam, and a projection or cam nub 27 is formed at one point on the periphery of the cam. An operating notch 28 is also formed in the periphery of the driver cam.

A tubular shaft 29, coaxial with the spindle 20, is fixed upon the base wall 30 of the cover 10 and extends inwardly to a point adjacent the driver cam 22, and receives the reduced end 21a of the spindle. A plurality of cylindrical tumblers 31 are rotatably mounted upon the tubular shaft 29 and each is provided with a gate 32.

These tumblers, together with the driver cam 22, form a series of tumblers as disclosed in said Abbott and Miller Patent No. 1,956,304, and the usual pin, lever and circular segment means disclosed in detail in said patent, or equivalent means, coact between the driver cam and the innermost tumbler, and between each tumbler and the next outer tumbler, as described in detail in said patent, whereby by manipulation of the dial and setting the combination, the gates 32 of the tumblers are aligned with each other and with the operating notch 28 of the driver cam for unlocking the lock.

An operating lever 33 is pivotally mounted at one end upon the bolt-operating cam plate 13. For this purpose, a bearing boss 34 is formed upon this end of the operating lever and journalled upon the stud or pin 35 fixed to the cam plate 13.

A fence 36 is formed upon the other end of the operating lever 33 and adapted to enter the gates 32 of the tumblers 31 when said gates are aligned with the fence, and a driving lug or tongue 37 is formed upon this end of the operating lever at one end of the fence for engagement in the operating notch 28 of the driver cam 22, as in usual and well known practice.

An extension 36a is formed upon the fence and extends into the opening 36b in the cam plate 13, which limits the movement of the fence toward and away from the tumblers. A transverse slot 38 is formed in the free end of the operating lever 33.

A U-shape bearing bracket, indicated generally at 39, is attached to the cam plate 13 at a point spaced from the fence. This bracket comprises the closed end 40 with spaced legs 41 and 42 extending from opposite ends thereof, the leg 42 providing for attachment to the cam plate 13 as by the screws 43.

A U-shape lever actuator, indicated generally at 44, is pivotally connected to the bearing bracket 39 and comprises the cross bar 45 with parallel legs 46 extending from opposite ends thereof, the free ends of said legs being pivotally connected to the end of the leg 41 of the bearing bracket 39 and to the cam plate 13, as by screws 47 and 48 respectively. The cross bar 45 of the lever actuator is received within the transverse slot 38 in the free end of the operating lever 33, forming a pivotal connection therewith.

A trigger, indicated generally at 50, is pivotally mounted upon the cam plate 13 adjacent to the bracket 39, as by the screw 51. The trigger has an inwardly offset arm 52 extending upwardly centrally between the legs 41 and 42 of the bracket 39 and connected by the coil spring 53 to the cross bar 45 of the lever actuator.

As shown in FIG. 1, the coil spring 53 is located above the pivotal center 47 of the lever actuator, so as to press the fence 36 upward or away from the tumblers 31. A tail 54 is formed upon the trigger, on the other side of the pivot 51 thereof, and is normally held in contact with the stud 55 on the cam plate 13, which acts as a stop to hold the trigger against further movement in this direction, as shown in FIG. 1.

The shoe 56 of the trigger is thus held in the path of the projection or nub 27 upon the periphery of the driver cam. With each rotation of the driver cam 22, as the operating notch 28 thereof is aligned with the fence 36, the projection or cam nub 27 on the driver cam will engage the shoe 56 of the trigger, momentarily moving the trigger to the position shown in FIG. 2, moving the spring 53 below the pivotal center 47 and, through the lever actuator 44, causing the fence 36 to momentarily move toward the tumblers 31.

The instant the high point or cam nub 27 passes out of engagement with the shoe 56 of the trigger, the spring 53 will pull the parts back to the position shown in FIG. 1, again pressing the fence 36 away from the tumblers.

Figure 2:
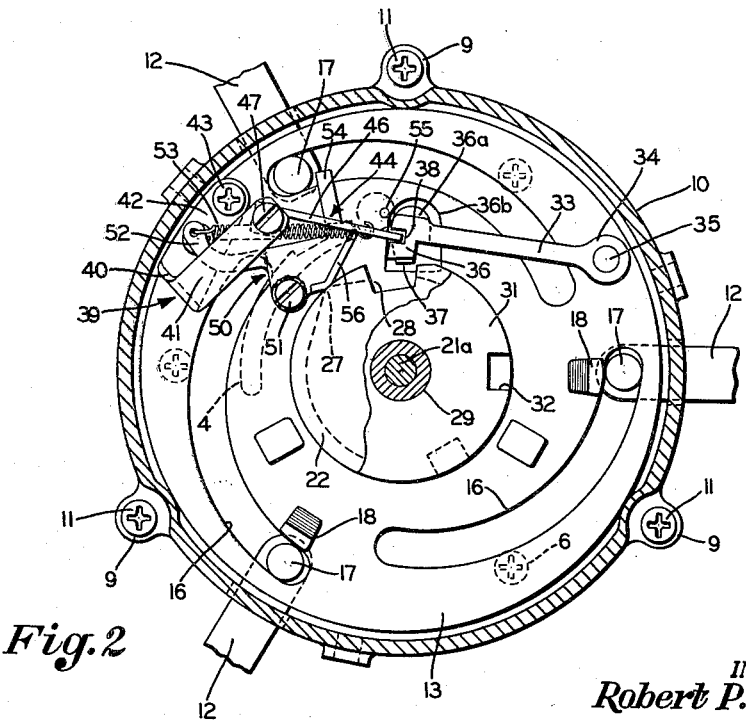
FIG. 2 is a view similar to FIG. 1 at the instant the trigger is tripped by the cam nub to momentarily move the fence toward the tumblers.

In the operation of the device, each time that the driver cam 22 rotates to the position shown in FIG. 2, the fence is thus momentarily moved toward the tumblers. If the tumbler gates are not aligned, the fence is immediately moved up away from the tumblers and the lock remains locked.

It is not possible to obtain a sense of feel, because the fence is thus only momentarily moved toward the tumblers once during each revolution of the driver cam and is held away from the tumblers by the spring 53 throughout the entire remainder of each revolution thereof.

Therefore, this momentary movement of the fence once during each revolution of the driver cam is of no aid in the determination surreptitiously of the locations of the tumbler gates. Assuming that when the driver cam 22 reaches the position of FIG. 2, the several tumblers have been moved so that their gates are in alignment with the operating notch 28 of the driver cam and with the fence, with the parts in this relationship, as the high point or cam nub of the driver cam moves the trigger to the position shown in FIG. 2, the fence 36 will enter the several tumbler gates.

By further rotation of the driver cam 22 in counter clockwise direction, as viewed in the drawings, the cam plate 13 being then connected by the operating lever 33 to the driver cam through the lug 37 and operating notch 28, the cam plate will be rotated in counter clockwise direction as viewed in the drawings, moving the studs 17 of the bolts 12 to the inner ends of the cam slots 16 in the cam plate 13 and withdrawing the bolts 12, as shown in FIG. 3.

As shown in FIGS. 3 and 4, when the fence is thus received in the gates of the tumblers and the parts are rotated to unlocked position, the extension 36a upon the fence is received beneath the arcuate rib 4 on the back wall 2 of the lock housing, positively holding the fence in the gates of the tumblers until the parts are again moved to the locked position of FIGS. 1 and 2.

Upon a reverse rotation of the driver cam 22, that is in clockwise direction as viewed in the drawings, the cam plate 13 will be rotated in clockwise direction, moving the studs 17 of the bolts 12 back to the outer ends of the cam slots 16 of the cam plate, as shown in FIGS. 1 and 2, and thus projecting the bolts 12 to locked position. By spinning the dial the combination may be dispersed in usual manner.

Rotation of the cam plate 13 in either direction is limited by the studs 7 and 7a upon the back wall 2 of the housing. The lug 58 upon the back of the cam plate 13 will contact the stud 7 when the parts are moved to locked position and will contact the stud 7a, as shown in FIGS. 3 and 4, when the parts are moved to unlocked position.

From the above it will be obvious that the over-center spring mechanism prevents surreptitious detection of the combination, by pressing the fence away from the tumblers at all times excepting momentarily during each rotation of the driver cam, when the cam nub 27 thereof engages the shoe 56 of the trigger and moves the trigger to the position of FIG. 2, momentarily moving the fence 36 toward the tumblers, after which it is instantaneously moved away from the tumblers by action of the spring 53, as soon as the cam nub 27 is disengaged from the shoe of the trigger.

It is also obvious that the dial, or any added vernier device or extension thereto, cannot indicate to the picklock the distance between that surface of the fence in contact with the tumbler periphery and the center axial line of said tumblers.

It will also be obvious that this lock cannot be manipulated by being run to wear down. If the lock is run until the cam nub 27 of the driver cam or the shoe 56 of the trigger, or both, are worn off so that the trigger cannot be operated thereby, the spring 53 will permanently hold the fence away from the tumblers, as shown in FIG. 1, so that the lock cannot be operated.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. In a combination lock, a fence, a series of rotatable tumblers having gates into which said fence enters upon alignment of said gates and said fence, a projection upon one of said tumblers, an operating lever pivoted at one end, said fence being fixed upon the other end of said operating lever, a lever actuator pivoted at one end, means providing a loose pivotal connection between the other end of said lever actuator and said other end of said operating lever, a trigger pivoted adjacent to said lever actuator and having a shoe thereon, a spring connected to said other end of the lever actuator remote from said one end thereof and to said trigger for holding the shoe thereof in the path of said projection and providing the sole means for normally pressing said fence away from said tumblers throughout the greater portion of the rotation of said one tumbler, said projection being arranged to engage the shoe of said trigger only once during each revolution of said one tumbler for momentarily moving said fence toward said tumblers, said spring immediately pressing said fence away from said tumblers when said trigger is released from said projection.

2. In a combination lock, a fence, a series of rotatable tumblers having gates into which said fence enters upon alignment of said gates and said fence, a projection upon one of said tumblers, an operating lever pivoted at one end, said fence being fixed upon the other end of said operating lever, there being a transverse slot in said other end of said operating lever, a lever actuator pivoted at one end, the other end of said lever actuator being pivoted in said slot in said other end of said operating lever, a trigger pivoted adjacent to said lever actuator and having a shoe thereon, a spring connected to said other end of the actuator lever and to said trigger for holding the shoe thereof in the path of said projection and for normally pressing said fence away from said tumblers, said projection being arranged to engage the shoe of said trigger once during each revolution of said one tumbler for momentarily moving said fence toward said tumblers, said spring immediately pressing said fence away from said tumblers when said trigger is released from said projection.

3. In a combination lock, a fence, a series of rotatable tumblers having gates into which said fence enters upon alignment of said gates and said fence, a projection upon one of said tumblers, an operating lever pivoted at one end, said fence being fixed upon the other end of said operating lever, a U-shape bracket, a U-shape lever actuator pivoted at its open end to the open end of said U-shaped bracket, the other end of said lever actuator being pivoted to said other end of said operating lever, a trigger pivoted adjacent to said lever actuator, a spring connected to said other end of said lever actuator and to said trigger for holding a portion of said trigger in the path of said projection and for normally pressing said fence away from said tumblers, said projection being arranged to engage said trigger once during each revolution of said one tumbler for momentarily moving said fence toward said tumblers, said spring immediately pressing said fence away from said tumblers when said trigger is released from said projection.

4. In a combination lock, a housing, lock means within the housing comprising a fence, a series of rotatable tumblers having gates into which said fence enters upon alignment of said gates and said fence, a projection upon one of said tumblers, bolt mechanism movable relative to said housing, an operating lever pivoted at one end upon said bolt mechanism, said fence being fixed to the other end of said operating lever, a lever actuator pivoted at one end upon said bolt mechanism, the other end of said lever actuator being pivoted to said other end of said operating lever, a trigger pivoted upon said bolt mechanism adjacent to said lever actuator, a spring connected to said other end of the lever actuator and to said trigger for holding a portion of the trigger in the path of said projection and providing the sole means for normally pressing said fence away from said tumblers during the greater portion of the rotation of said one tumbler, said projection being arranged to engage the trigger only once during each revolution of said one tumbler for momentarily moving said fence toward said tumblers, said spring immediately pressing said fence away from said tumblers when said trigger is released from said projection.

5. In a combination lock, a fence, a series of rotatable tumblers having gates into which said fence enters upon alignment of said gates and said fence, a projection upon one of said tumblers, a rotatable bolt operating cam plate, bolts operatively connected to said cam plate, an operating lever pivoted at one end upon said cam plate, said fence being fixed to the other end of said operating lever, a lever actuator pivoted at one end upon said cam plate, the other end of said lever actuator being pivoted to said other end of said operating lever, a trigger pivoted upon said cam plate adjacent to said lever actuator, a spring connected to said other end of the lever actuator and to said trigger for holding a portion of the trigger in the path of said projection and for normally pressing said fence away from said tumblers, said projection being arranged to engage the trigger once during each revolution of said one tumbler for momentarily moving said fence toward said tumblers, said spring immediately pressing said fence away from said tumblers when said trigger is released from said projection, and means for rotating said cam plate for retracting said bolts when said fence enters said gates.

6. In a combination lock, a fence, a series of rotatable tumblers having gates into which said fence enters upon alignment of said gates and said fence, a projection upon one of said tumblers, bolt mechanism including a reciprocable bolt, an operating lever pivoted at one end upon said bolt mechanism, said fence being fixed to the other end of said operating lever, a lever actuator pivoted at one end upon said bolt mechanism, the other end of said lever actuator being pivoted to said other end of said operating lever, a trigger pivoted upon said bolt mechanism adjacent to said lever actuator, a spring connected to said other end of the lever actuator and to said trigger for holding a portion of the trigger in the path of said projection and providing the sole means for pressing said fence away from said tumblers throughout the greater portion of the rotation of said one tumbler, said projection being arranged to engage the trigger once during each revolution of said one tumbler for momentarily moving said fence toward said tumblers, said spring immediately pressing said fence away from said tumblers when said trigger is released from said projection, said fence being movable incidental to rotation of said tumblers after said fence enters the gates thereof, and means whereby said movement of said fence by said tumblers retracts the reciprocable bolt.

7. In a combination lock, a fence, a series of rotatable tumblers having gates into which said fence enters upon alignment of said gates and said fence, a projection upon one of said tumblers, a rotatable bolt operating cam plate, bolts operatively connected to said cam plate, an operating lever pivoted at one end upon said cam plate, said fence being fixed to the other end of said operating lever, a lever actuator pivoted at one end upon said cam plate, the other end of said lever actuator being pivoted to said other end of said operating lever, a trigger pivoted upon said cam plate adjacent to said lever actuator, a spring connected to said other end of the lever actuator and to said trigger for holding a portion of the trigger in the path of said projection and for pressing said fence away from said tumblers, said projection being arranged to engage the trigger once during each revolution of said one tumbler for momentarily moving said fence toward said tumblers, said spring immediately pressing said fence away from said tumblers when said trigger is released from said projection, said fence being movable incidental to rotation of said tumblers after said fence enters the gates thereof, and means whereby said movement of said fence by said tumblers rotates said cam plate to retract said bolts.

8. In a combination lock, a housing, lock means within the housing comprising bolt means movable relative to said housing, a fence, a series of rotatable tumblers having gates into which said fence enters upon alignment of said gates and said fence, a projection upon one of said tumblers, an operating lever pivoted at one end upon said bolt means, said fence being fixed to the other end of said operating lever, a lever actuator pivoted at one end upon said bolt means, the other end of said lever actuator being pivoted to said other end of said actuating lever, a trigger pivoted upon said bolt means adjacent to said lever actuator, a spring connected to said other end of said lever actuator and to said trigger for holding a portion of the trigger in the path of said projection and providing the sole means for pressing said fence away from said tumblers during the greater portion of the rotation of said one tumbler, said projection being arranged to engage the trigger only once during each revolution of said one tumbler for momentarily moving said fence toward said tumblers, said spring immediately pressing said fence away from said tumblers when said trigger is released from said projection, said fence being movable incidental to rotation of said tumblers after said fence enters the gates thereof, and means whereby said movement of said fence by said tumblers retracts said bolt means.

9. In a combination lock, a housing, lock means within the housing comprising a fence, a series of rotatable tumblers having gates into which said fence enters upon alignment of said gates and said fence, a projection upon one of said tumblers, a rotatable bolt operating cam plate having an opening therein, bolts operatively connected to said cam plate, an extension upon said fence located through said opening, an operating lever pivoted at one end upon said cam plate, said fence being fixed to the other end of said operating lever, a lever actuator pivoted at one end upon said cam plate, the other end of said lever actuator being pivoted to said other end of said operating lever, a trigger pivoted upon said cam plate adjacent to said lever actuator, a spring connected to said other end of the lever actuator and to said trigger for holding a portion of the trigger in the path of said projection and for normally pressing said fence away from said tumblers, said projection being arranged to engage the trigger once during each revolution of said one tumbler for momentarily moving said fence toward said tumblers, said spring immediately pressing said fence away from said tumblers when said trigger is released from said projection, said fence being movable incidental to rotation of said tumblers after said fence enters the gates thereof, an arcuate rib in the housing, the extension upon the fence engaging said arcuate rib for holding the fence in the gates during such rotation of the tumblers, and means whereby said movement of the fence by said tumblers rotates said cam plate to retract said bolts.

10. In a combination lock, a fence, a series of rotatable tumblers having gates into which said fence enters upon alignment of said gates and said fence, over-center spring mechanism including a spring having a stable position on one side of center only providing the sole means for normally pressing said fence away from said tumblers throughout the greater portion of the rotation of one of said tumblers, and means upon said one tumbler for engaging said over-center spring mechanism only once in each revolution of said one tumbler for overcoming said over-center spring means by increasing tension on the spring and moving it to an unstable position on the other side of center for momentarily moving said fence toward said tumblers, said over-center spring mechanism immediately returning to the stable position on said one side of center and pressing said fence away from said tumblers when said over-center spring means is released by said means upon said one tumbler.

11. In a combination lock, a fence, a series of tumblers mounted for rotation about a single axis and having gates into which the fence enters upon alignment of said gates and said fence, a dial rotating in said axis, means whereby said dial sets said tumblers, over-center spring mechanism including a spring having a stable position on one side of center only providing the sole means for normally pressing said fence away from said tumblers throughout the greater portion of the rotation of one of said tumblers, and means engaging said over-center spring mechanism only once in each revolution of said dial for overcoming said over-center spring means by increasing tension on the spring and moving it to an unstable position on the other side of center for momentarily moving the fence toward said tumblers, said over-center spring means immediately returning to the stable position on said one side of center and pressing said fence away from said tumblers when said over-center spring means is released by said engaging means.

12. In a combination lock, a fence, a series of rotatable tumblers having gates into which said fence enters upon alignment of said gates and said fence, over-center spring mechanism including a spring having a stable position on one side of center only providing the sole means for normally pressing said fence away from said tumblers throughout the greater portion of the rotation of one of said tumblers, a trigger in said over-center spring mechanism, and a projection upon said one tumbler for engaging said trigger only once in each revolution of said one tumbler for overcoming said over-center spring means by increasing tension on the spring and moving it to an unstable position on the other side of center for momentarily moving said fence toward said tumblers, said over-center spring mechanism immediately returning to the stable position on said one side of center and pressing said fence away from said tumblers when said trigger is released from said projection.

References Cited in the file of this patent

UNITED STATES PATENTS

| | | |
|---|---|---|
| 71,373 | Flesch | Nov. 26, 1867 |
| 1,391,999 | Czyz | Sept. 27, 1921 |
| 1,956,304 | Abbott et al. | Apr. 24, 1934 |
| 2,660,873 | Bennett et al. | Dec. 1, 1953 |
| 2,722,820 | Coffey | Nov. 8, 1955 |
| 2,775,113 | Behrens | Dec. 25, 1956 |
| 2,779,185 | Papini | Jan. 29, 1957 |

FOREIGN PATENTS

| | | |
|---|---|---|
| 25,775 | France | Feb. 6, 1923 |
| 735,148 | Great Britain | Aug. 17, 1955 |